(12) United States Patent
Ohmiya

(10) Patent No.: US 6,250,669 B1
(45) Date of Patent: Jun. 26, 2001

(54) INSTRUMENT PANEL HAVING INTEGRAL AIRBAG DOOR PORTION

(75) Inventor: Masaki Ohmiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/324,115

(22) Filed: Jun. 2, 1999

(30) Foreign Application Priority Data

Oct. 13, 1998 (JP) .................................................. 10-290436

(51) Int. Cl.$^7$ .................................................. B60R 21/16
(52) U.S. Cl. .................. 280/732; 280/728.2; 280/728.3; 280/730.1; 280/752
(58) Field of Search .................. 280/732, 728.2, 280/728.3, 730.1, 752

(56) References Cited

U.S. PATENT DOCUMENTS

| | | |
|---|---|---|
| 4,893,833 | 1/1990 | DiSalvo et al. . |
| 5,031,930 | 7/1991 | Sato . |
| 5,217,253 | 6/1993 | Pray . |
| 5,277,443 | 1/1994 | Grant et al. . |
| 5,342,085 * | 8/1994 | Hirashima et al. ............ 280/732 X |
| 5,435,596 * | 7/1995 | Rose et al. ........................ 280/728.2 |
| 5,439,246 | 8/1995 | Ravenberg et al. . |
| 5,527,065 * | 6/1996 | Saberan et al. .................. 280/728.3 |
| 5,588,674 * | 12/1996 | Yoshimura et al. ................ 280/732 |
| 5,639,112 * | 6/1997 | Phillion et al. ................... 280/728.2 |
| 5,803,487 * | 9/1998 | Kikuchi et al. ................... 280/728.2 |
| 5,941,558 * | 8/1999 | Labrie et al. ..................... 280/728.3 |
| 5,961,142 * | 10/1999 | Shiraki et al. .................... 280/728.3 |
| 6,010,146 * | 1/2000 | Otsuka et al. .................... 280/728.2 |

FOREIGN PATENT DOCUMENTS

| | | |
|---|---|---|
| 10-211830 | 8/1998 | (JP) . |
| 10-211831 | 8/1998 | (JP) . |
| 10-211832 | 8/1998 | (JP) . |

* cited by examiner

*Primary Examiner*—Lanna Mai
*Assistant Examiner*—Toan To
(74) *Attorney, Agent, or Firm*—Oliff & Berridge, PLC (57) ABSTRACT

A panel with an airbag is provided including a mounting flange portion. The mounting flange portion breaks at a thin wall portion of the mounting flange portion when a door insert is pushed toward the passenger compartment of a vehicle by the inflating pressure of an airbag during airbag deployment. The thin wall portion is formed between a plate portion of the door insert and protrusions formed on the mounting flange portion for engagement with a peripheral edge portion of an opening of the instrument panel insert. After the thin portion of the mounting flange portion breaks, substantially only the plate portion of the door insert is deployed toward the passenger compartment, leaving the mounting flange portion of the door insert at an airbag case side.

14 Claims, 8 Drawing Sheets

INSTRUMENT PANEL HAVING INTEGRAL AIRBAG DOOR PORTION

BACKGROUND OF THE INVENTION

Incorporation by Reference

The disclosure of Japanese Patent Application No. Hei 10-290436 filed on Oct. 13, 1998 including the specification, drawings and abstract is incorporated herein by reference in its entirety.

1. Field of Invention

The present invention relates to an instrument panel having an integral airbag door portion. In particular, the invention relates to an instrument panel having an integral airbag door portion for an airbag unit that is installed in a vehicle.

2. Description of Related Art

An instrument panel construction, in which an airbag door portion of an automotive passenger seat side airbag unit is integrated, is known. Such an arrangement is disclosed in, for example, Japanese Patent Application Laid-Open No. Hei 10-211831.

Figure 8:
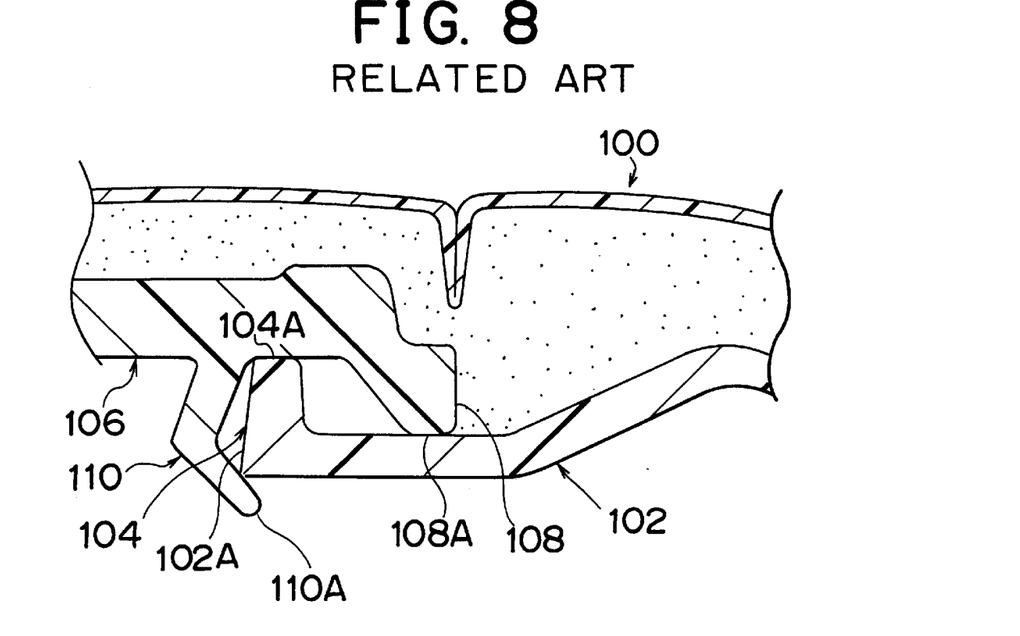
FIG. 8 is an enlarged side sectional view of a portion of a known instrument panel having an integral airbag door portion.

A known instrument panel 100 having an integral airbag door portion is shown in FIG. 8. An instrument panel insert 102 has a protruded portion 104 that is formed along the peripheral edge of an opening of the instrument panel insert 102. An upper surface of the protruded portion 104 serves as a first seal surface 104A for preventing leakage of a foaming agent during a forming process. A door insert 106 has a protruded portion 108 that extends around and outwardly of the first seal surface 104A of the instrument panel insert 102. A lower surface of the protruded portion 108 serves as a second seal surface 108A. A plurality of engaging ribs 110 are formed on a lower surface of a rear end portion of the door insert 106, that is, an end portion of the door insert 106 located rearward with respect to a vehicle body. Each rib 110 has a generally dogleg shape in a side view. A distal end adjacent portion 110A of each rib 110 has an inclined surface on which the distal end adjacent portion 110A is engaged with the peripheral edge portion of the opening portion 102A of the instrument panel insert 102.

Figure 9:
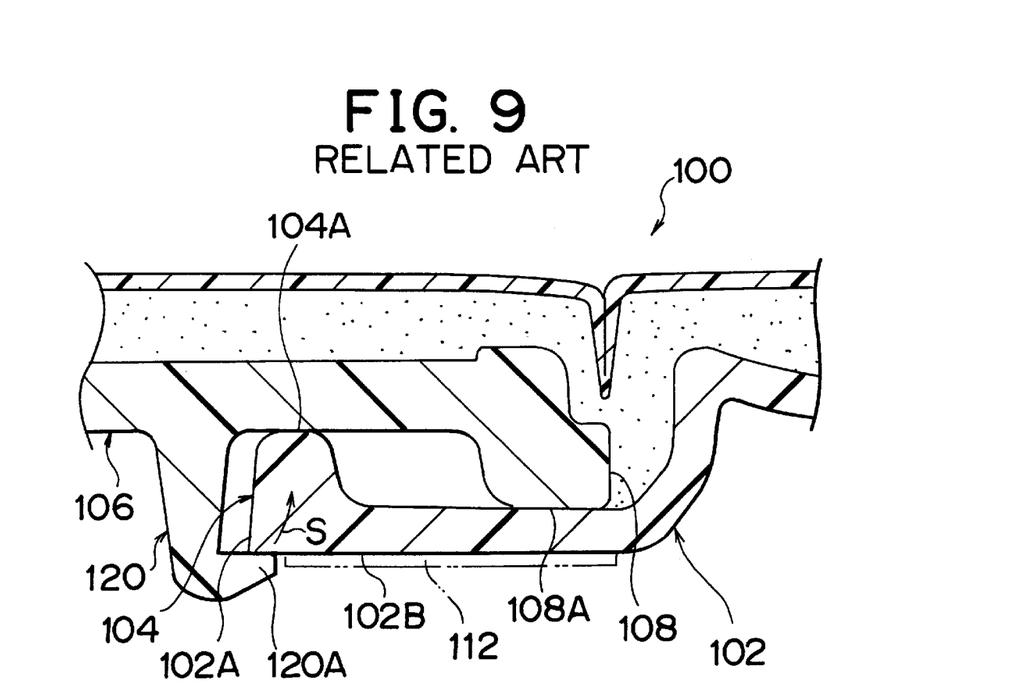
FIG. 9 is an enlarged side sectional view of a portion of a known instrument panel with the integral airbag door portion that is different from the portion shown in FIG. 8.

In an instrument panel with the integral airbag door portion, a plurality of engaging ribs 120 may be formed on lower surfaces of right and left side end portions of the door insert 106, that is, opposite end portions thereof, in the directions of the width of a vehicle body, as shown in FIG. 9. Each rib 120 has a generally "L" shape in a side view. A distal end portion 120A of each rib 120 is engaged with an edge portion of the opening 102A of the instrument panel insert 102. Therefore, when the inflator of the airbag unit is operated, the distal end portions 120A of the ribs 120 formed on the door insert 106 push up the peripheral edge portion of the opening 102A of the instrument panel insert 102 with high load in a deploying direction, as indicated by arrow S in FIG. 9. Hence, a peripheral portion 102B of the opening 102A of the instrument panel insert 102 must be constructed to withstand the great load applied thereto during airbag deployment. This is accomplished by reinforcing the peripheral edge portion 102B of the opening 102A of the instrument panel insert 102 with a reinforcement plate 112, such as an iron or steel plate, or the like. This plate is shown by a two-dot broken line in FIG. 9.

SUMMARY OF THE INVENTION

Accordingly, it is an object of the present invention to provide an instrument panel having an integral airbag door portion that does not require reinforcement of an opening peripheral edge portion of an instrument panel insert.

In accordance with one aspect of the invention, an instrument panel having an integral airbag door portion, includes a skin. The skin forms a compartment side design surface of the instrument panel. The instrument panel further includes a door insert deployable toward a compartment about a forward side portion of the door insert located forward with respect to a vehicle, an instrument panel insert having an opening that is engaged with the door insert, and a foamed layer expanded between the skin and the door insert and between the skin and the instrument panel insert. The door insert includes a seal portion formed between the door insert and the instrument panel insert. The seal portion prevents leakage of a foaming agent during an expanding formation of the foamed layer. The door insert also includes a mounting flange portion protruded from a lower surface of the door insert. The mounting flange portion is used for mounting the door insert to an airbag case. The door insert includes at least one protrusion formed on the mounting flange portion, the protrusion engaging with an edge portion of the opening of the instrument panel insert, and a fragile portion formed at a position in the mounting flange portion, excluding a portion of the mounting flange portion located near a deploying center of the door insert. The position is located between the protrusion and a general plate portion of the door insert. The fragile portion is breakable during airbag deployment.

In accordance with this aspect of the invention, the door insert may be pushed toward the passenger compartment by the inflating pressure of an airbag during deployment of the airbag. As a result, the mounting flange portion, excluding a portion thereof located near the deploying center of the door insert, breaks at the fragile portion of the mounting flange portion. The fragile portion is formed between the general plate portion of the door insert and the at least one protrusion formed on the mounting flange portion for engagement with the edge portion of the opening of the instrument panel insert. When the fragile portion is broken, substantially only the general plate portion of the door insert is deployed toward the passenger compartment. As a result, the mounting flange portion of the door insert is left at the airbag case side. This is because the mounting flange portion of the door insert is mounted to the airbag case by a claw engagement, or the like. Therefore, the at least one protrusion does not push up the edge portion of the opening of the instrument panel insert with a high load during airbag deployment. Hence, there is no need to provide a reinforcement for the edge portion of the opening of the instrument panel insert because the opening edge portion of the instrument panel insert does not receive a high load during airbag deployment.

In the instrument panel described above, the mounting flange portion of the door insert may have such a frame shape so as to surround a generally rectangular opening of the airbag case. The at least one protrusion may be formed on all sides of the mounting flange portion.

Therefore, the door insert can be secured to the instrument panel insert by using the protrusions formed on all the sides of the mounting flange portion of the door insert. The door insert may have a frame shape so as to surround the generally rectangular opening of the airbag case, to which the door insert is mounted. Therefore, it becomes unnecessary to perform an operation of fastening the door insert to the instrument panel insert. Thus, the assembling efficiency improves.

The door insert may have an integral hinge that is formed in the general plate portion of the door insert. The integral hinge may be rearward of a forward side mounting flange portion located forward with respect to the vehicle. The integral hinge serves as a pivoting center during airbag deployment.

Therefore, the general plate portion of the door insert is turned open about the integral hinge during airbag deployment. Thus, the door insert does not push down, with a high load. A forward edge portion of the opening of the instrument panel insert is secured by the protrusions of a forward side mounting flange portion. Thus, this construction prevents breakage of the forward edge portion of the opening of the instrument panel insert without requiring an iron or steel plate reinforcement or the like.

BRIEF DESCRIPTION OF THE DRAWINGS

The foregoing and further objects, features and advantages of the present invention will become apparent from the following description of exemplary embodiments with reference to the accompanying drawings, wherein like numerals are used to represent like elements and wherein.

DETAILED DESCRIPTION OF PREFERRED EMBODIMENTS

While the invention will hereinafter be described in connection with exemplary embodiments thereof, it will be understood that it is not intended to limit the invention to those embodiments. On the contrary, it is intended to cover all alternatives, modifications and equivalents that may be included within the spirit and scope of the invention.

For a general understanding of the features of the invention, reference is made to the drawings. In the drawings, like reference numerals have been used throughout to designate like elements An exemplary embodiment of the instrument panel having an integral airbag door portion of the present invention will be described in detail hereinafter with reference to FIGS. 1 through 6.

In the drawings, arrows FR indicate a forward direction with respect to a vehicle, and arrows UP indicate an upward direction with respect to the vehicle.

Figure 3:
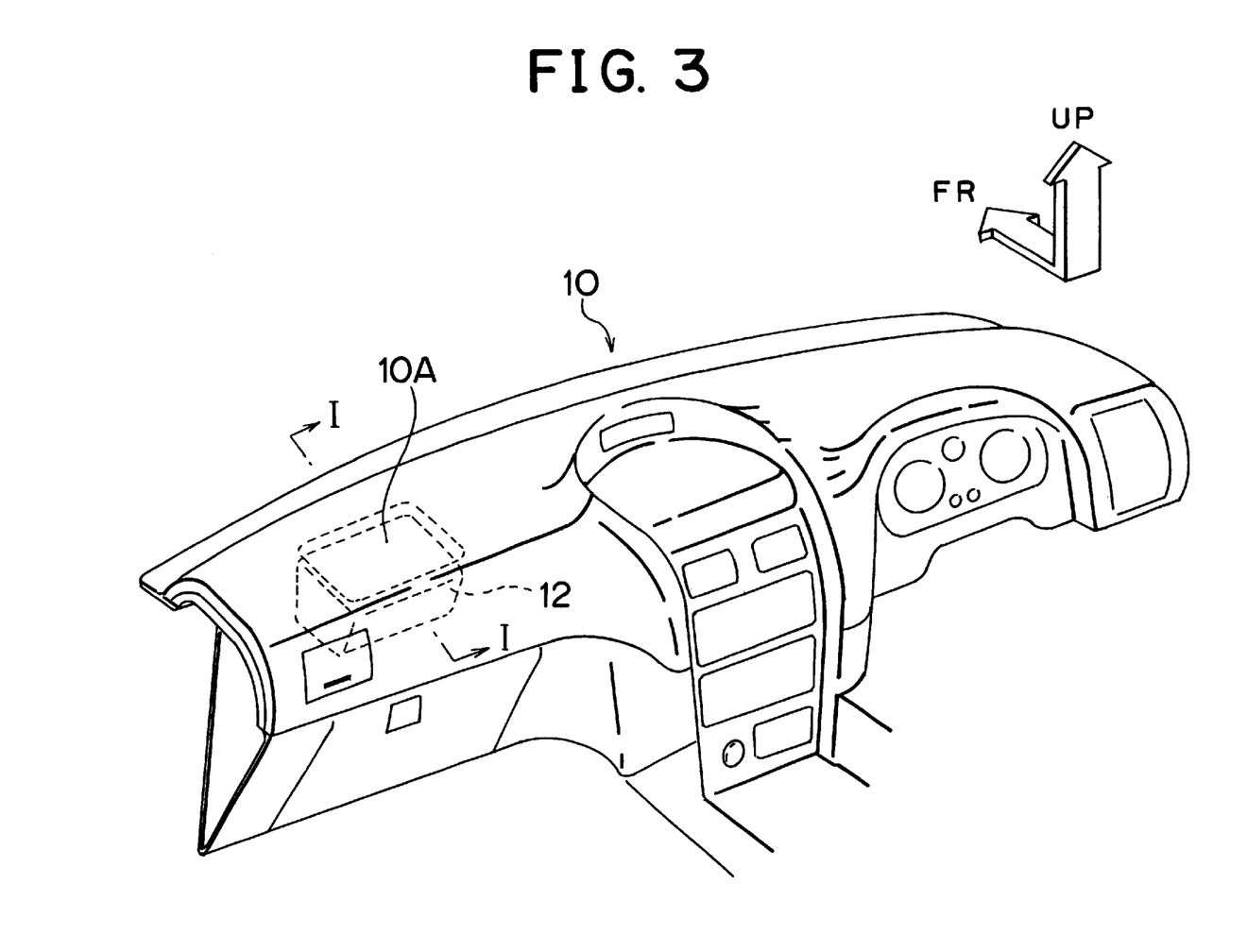
FIG. 3 is a perspective view of the instrument panel with the integral airbag door portion in accordance with an embodiment of the invention.

Referring to FIG. 3, an instrument panel 10 of this embodiment has a passenger seat side portion. This passenger seat side portion has an airbag door portion 10A that faces an airbag unit 12 disposed inside the instrument panel 10.

Figure 1:
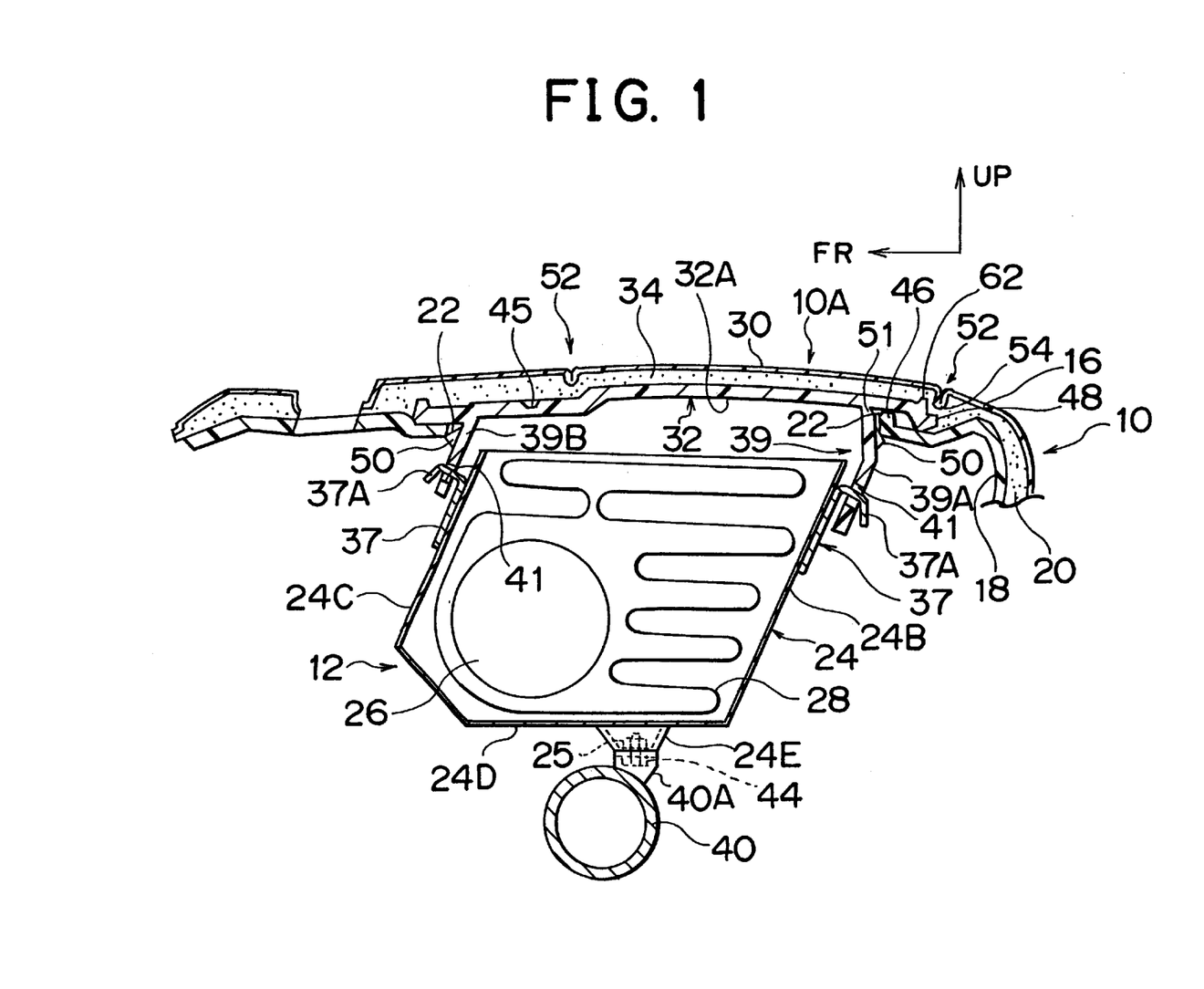
FIG. 1 is an enlarged sectional view taken along line I—I in FIG. 3 in accordance with an embodiment of the invention.

Referring to FIG. 1, the instrument panel 10 is substantially made of a skin 16 that is disposed on the passenger compartment side and an instrument panel insert 18 disposed apart from the skin 16. A foamed layer 20 fills the gap between the skin 16 and the instrument panel insert 18. The skin 16 is formed from a resin. The resin may include, for example, a soft resin such as polyvinyl chloride (PVC), a thermoplastic olefin-based elastomer (TPO), a thermoplastic urethane-based elastomer, or the like. The instrument panel insert 18 is formed from, for example, a reinforced polypropylene composite, a reinforced acrylonitrile-styrene composite, or the like. The foamed layer 20 is formed from a thermoplastic urethane or the like. Thus, the skin 16 has relatively low strength while the instrument panel insert 18 has relatively high strength.

The instrument panel insert 18 of the instrument panel 10 has an opening 22 at a predetermined position. The airbag unit 12 is disposed near the opening 22. The airbag unit 12 is substantially made of a generally box-shaped airbag case 24, a generally cylindrical inflator 26 fixed inside the airbag case 24, an airbag 28 disposed in a folded state at a side of the inflator 26, i.e., on the side of the inflator 26 that is closer to the opening 22 of the instrument panel insert 18.

The airbag door portion 10A is substantially made of a skin 30 that is a portion of the skin 16 of the instrument panel 10, a door insert 32 that is disposed apart from the skin 30 and formed from a resin (e.g., TPO), and a foamed layer 34 filling the gap between the skin 30 and the door insert 32. The foamed layer 34 is a portion of the foamed layer 20 of the instrument panel 10. The foamed layer 34 of the airbag door portion 10A and the foamed layer 20 of the instrument panel 10 form an integral foamed layer in this embodiment. That is, during the forming process of the instrument panel 10 of this embodiment, the foamed layer 34 and the foamed layer 20 are foamed or expanded together.

Figure 4:
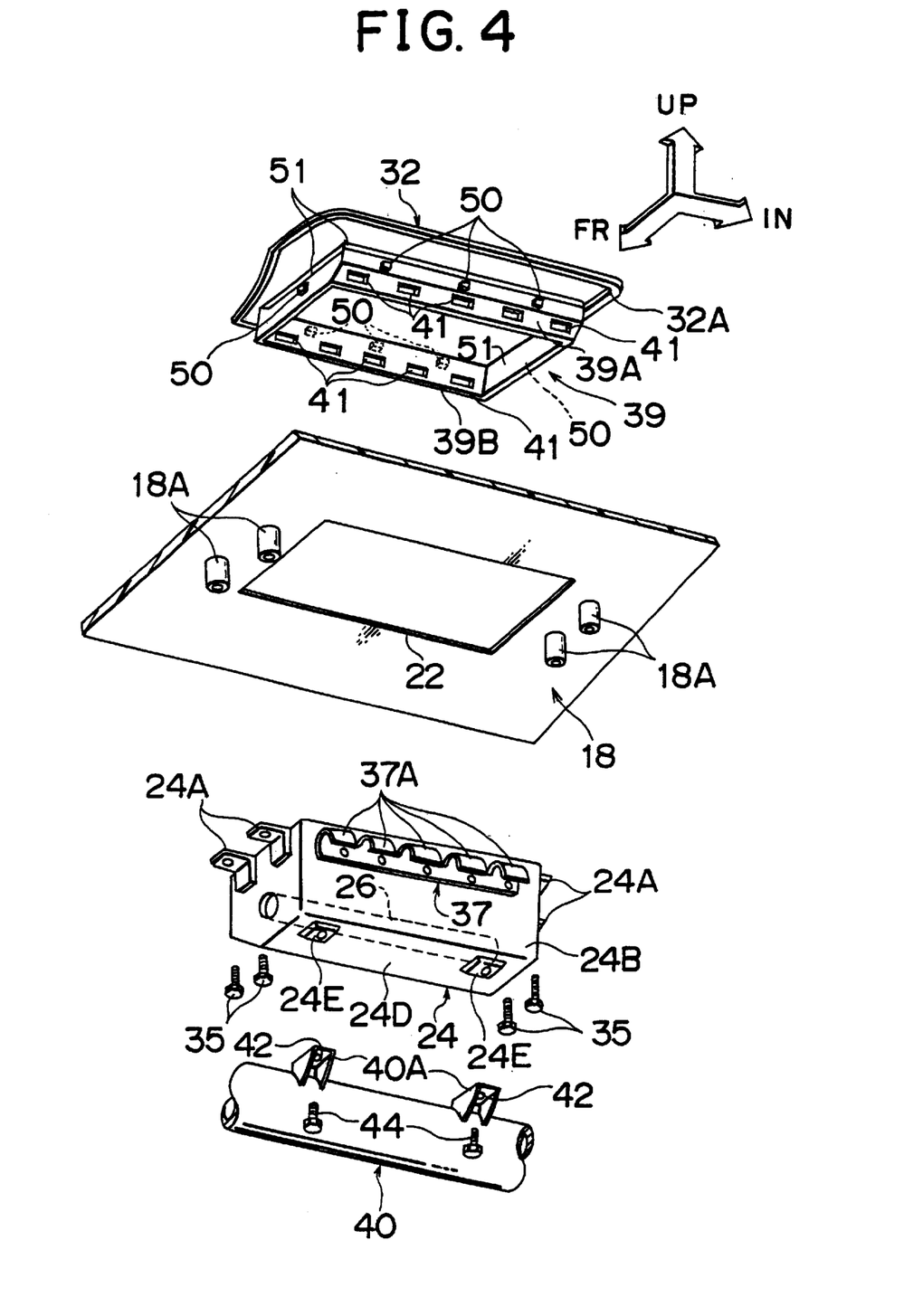
FIG. 4 is an exploded perspective view of the instrument panel with the integral airbag door portion, an airbag case, and a portion of an instrument panel reinforcement, viewed from a diagonally rearward perspective view with respect to the vehicle in accordance with an embodiment of the invention.

The airbag case 24 is, for example, an aluminum die-cast case having a generally box shape. As shown in FIG. 4, a pair of forward and rearward mounting portions 24A extend outward from each one of the right and left side portions of the opening of the airbag case 24. The mounting portions 24A are fastened to mounting portions 18A which protrude from the instrument panel insert 18. The mounting portions are fastened by fixture members 35 such as bolts, or the like.

A mounting flange 39 protrudes from an inner surface of a general plate portion 32A of the door insert 32. Such inner surface faces the airbag unit 12. The mounting flange 39 has a generally rectangular frame shape so as to surround a generally rectangular opening edge portion of the airbag case 24. A rearward side mounting flange portion 39A has a plurality of engaging holes 41. The engaging holes 41 are aligned at predetermined intervals in the directions of the vehicle width. An upper portion of a rearward side wall portion 24B of the airbag case 24 is provided with a panel 37. The panel 37 has a plurality of engaging claws 37A each having a generally inverted "U" shape in a side view. The engaging claws 37A of the panel 37 are engaged with the engaging holes 41 formed in the rearward mounting flange portion 39A of the door insert 32.

Similarly, a forward side mounting flange portion 39B is provided with a plurality of engaging holes 41. The engaging holes 41 are aligned at predetermined intervals in the directions of the vehicle width. As shown in FIG. 1, the engaging holes 41 of the forward side mounting flange portion 39B of the door insert 32 are engaged with engaging claws 37A of a panel 37. The panel 37 is disposed on an upper portion of a forward side wall portion 24C of the airbag case 24.

A pair of right and left mounting portions 24E protrude from a lower surface of a lower wall portion 24D of the airbag case 24. Each of the mounting portions 24E has a mounting hole into which a weld nut 25 is coaxially fixed.

As shown in FIG. 4, a cylindrically tubular instrument panel reinforcement 40 is formed as a vehicle body frame member. The reinforcement 40 extends in the directions of the vehicle width has a pair of right and left mounting portions 40A each of which has a mounting hole 42. Bolts 44 are inserted into the mounting holes 42 of the mounting portions 40A. The bolts 44 are screwed into the weld nuts 25 provided in the mounting portions 24E of the airbag case 24, as shown in FIG. 1.

As shown in FIG. 1, an integral hinge 45 serves as a turning or pivoting axis during deployment of the airbag door portion IOA. The integral hinge 45 extends in the directions of the vehicle width. The integral hinge 45 extends along a design face-side surface of the general plate portion 32A of the door insert 32 of the airbag door portion 10A. More specifically, the integral hinge 45 extends rearward of the forward side mounting flange portion 39B. Thus, the airbag door portion 10A is constructed as a single door that turns open about the integral hinge 45.

The inflator 26 has a generally cylindrical shape. A mechanical ignition type airbag sensor (not shown) for sensing a sharp vehicle deceleration is disposed on a side of the inflator 26. A detonator (not shown) is disposed in a moving path of a firing pin of the airbag sensor in the inflator 26. An enhancer, i.e., flame propagating agent, is provided surrounding the detonator. The enhancer is surrounded by a gas generating agent. The above described mechanical ignition type airbag sensor may be replaced by an electric ignition type airbag sensor. If an electric ignition type airbag sensor is employed for sensing a sharp vehicle deceleration, the electric ignition type airbag sensor is not disposed in the inflator. Rather, it is disposed at each of right and left front portions of the vehicle body, or below a console box, or the like. If the inflator 26 is operated upon receiving a predetermined high load, the airbag 28, which is folded in the airbag case 24, is inflated.

A generally "U" shaped groove 52 extends along the border between the skin 16 and the skin 30. The skin of the bottom portion of the groove 52 formed in the periphery of the airbag door portion 10A except the portion extending along the integral hinge 45 (forward of the vehicle) is thinner than the portion except the bottom of the groove 52 such that the thinner portion serves as a breakable portion 54 that breaks when the air bag inflating pressure acts thereon. Therefore, upon explosion of the airbag, breakage occurs in the breakable portion 54 formed on the periphery of the airbag door portion 10A at the rear side of the vehicle (the side closer to the occupant) and both sides across the width of the vehicle. In this embodiment, the breakable portion 54 is formed only along a periphery of the airbag door portion 10A, excluding a periphery thereof extending near and along the integral hinge 45. However, the breakable portion may instead be formed along the entire periphery of the airbag door portion 10A.

Figure 2:
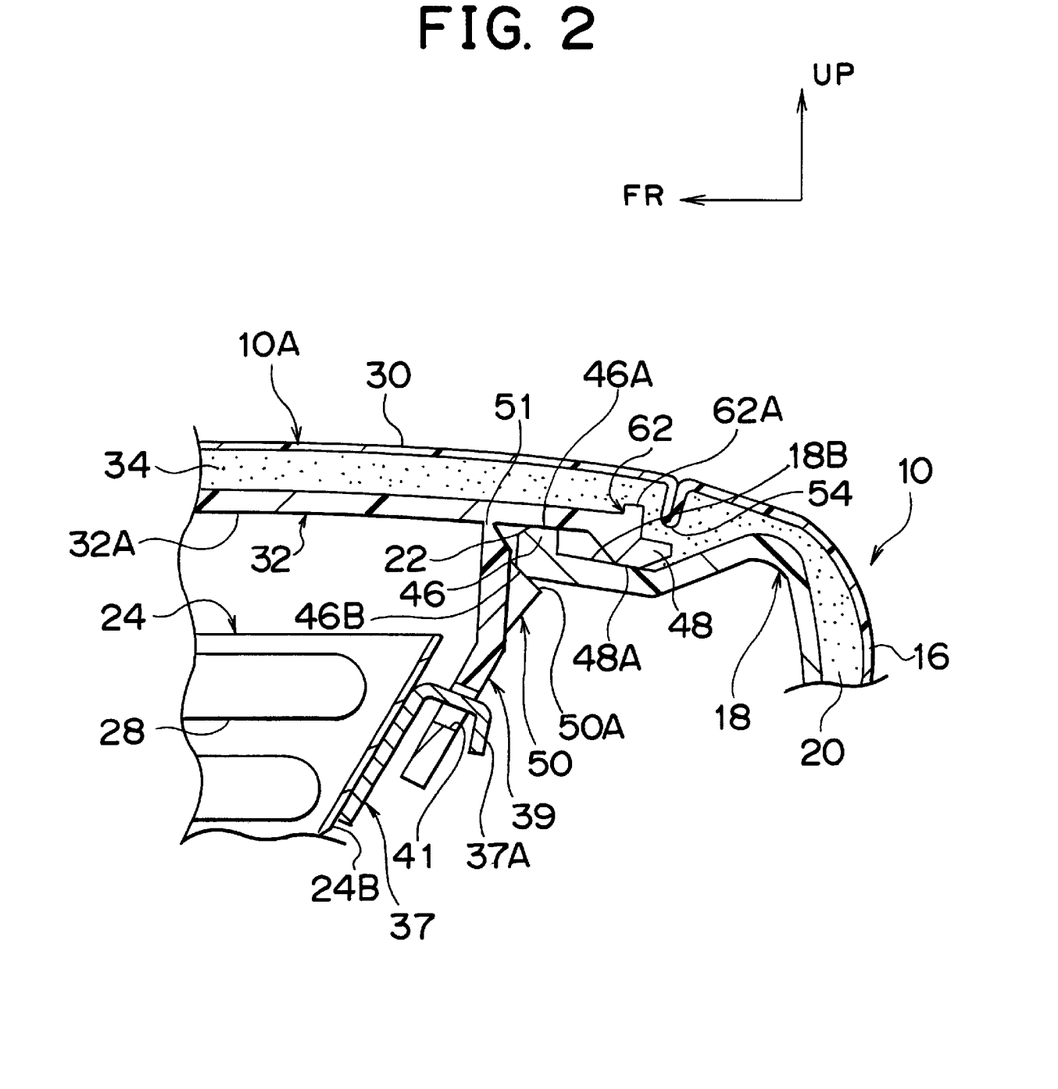
FIG. 2 is an enlarged side sectional view of a portion of an instrument panel having an integral airbag door portion according an embodiment of the invention.

As shown in FIG. 2, a protruded portion 46 protrudes from the peripheral edge portion of the opening 22 of the instrument panel insert 18. The protruded portion 46 protrudes toward the door insert 32 (upward in FIG. 2). An upper surface of the protruded portion 36 forms a first seal surface 46A that contacts a lower surface of an outer edge portion of the general plate portion 32A of the door insert 32. A protruded portion 48 protrudes from an outer edge portion of the door insert 32 toward the instrument panel insert 18 (downward in FIG. 2). The outer edge portion is positioned outwardly of the first seal surface 46A. A lower surface of the protruded portion 48 forms a second seal surface 48A. The second seal surface 48A contacts an upper surface 18B of a peripheral edge portion of the opening 22 of the instrument panel insert 18. The first seal surface 46A and the second seal surface 48A prevent the foaming agent from leaking from a border between the airbag door portion 10A and the instrument panel insert 18 during the forming process of the instrument panel 10.

The mounting flange 39 of the door insert 32 has a plurality of protrusions 50 that contact the peripheral edge portion of the opening 22 of the instrument panel insert 18. The protrusions 50 are aligned at predetermined intervals on each side portion of the generally rectangular mounting flange 39 of the door insert 32 in the directions of the length of the side portion. Each protrusion 50 has a generally triangular shape in a side view, having an upper slope surface and a lower slope surface. The upper slope surface of a distal end (vertex) portion 50A of each protrusion 50 is engaged with a lower slope surface 46B of the protruded edge portion 46 of the instrument panel insert 18. Each side portion of the generally rectangular mounting flange 39, excluding a side portion extending near and along the integral hinge 45, has a notch at a site between the protrusions 50 and the general plate portion 32A of the door insert 32 (at a base end site in the mounting flange 39 in this embodiment). The notch provides the mounting flange 39 with a thin wall portion 51 that serves as a fragile portion that is breakable during airbag deployment. Thus, the breaking load or required strength of the breaking load can be adjusted by the wall thickness of the thin wall portion 51.

In this embodiment, a rib 62 protrudes from the upper surface of the door insert 32. The rib 62 extends near and along the breakable portion 54, excluding a section adjacent to the integral hinge portion 45. The thickness of the foamed layer 34 is reduced at a section between a top wall portion 62A of the rib 62 and the skin 30. Therefore, the top wall portion 62A of the rib 62 facilitates transmission of load to the breakable portion 54.

The method of forming the instrument panel 10 in this embodiment will be described below. The skin 16 and the skin 30 are initially formed together and are set in a mold. The mounting flange 39 of the door insert 32 is inserted into the opening 22 of the instrument panel insert 18. This is performed in a manner so that the protrusions 50 of the mounting flange 39 are engaged with the peripheral edge portion of the opening 22 of the instrument panel insert 18. While this joined state is maintained, the instrument panel insert 18 and the door insert 32 are set in the mold. Subsequently, the foaming agent is introduced into the gap between the skins 16, 30 and the instrument panel insert 18 and the door insert 32. The foaming agent is then expanded by a heat treatment so as to form the formed layer 20 and the foamed layer 34 integrally. In this step, the expanding pressure of the foaming agent acts on the door insert 32 and the instrument panel insert 18 so that without an appropriate sealing device, the foaming agent would leak from the border between the inserts. In this embodiment, however, the double sealing achieved by the first seal surface 46A and the second seal surface 48A prevents the foaming agent from leaking from the border between the door insert 32 and the instrument panel insert 18.

The operation of the embodiment will be hereinafter described.

Figure 5:
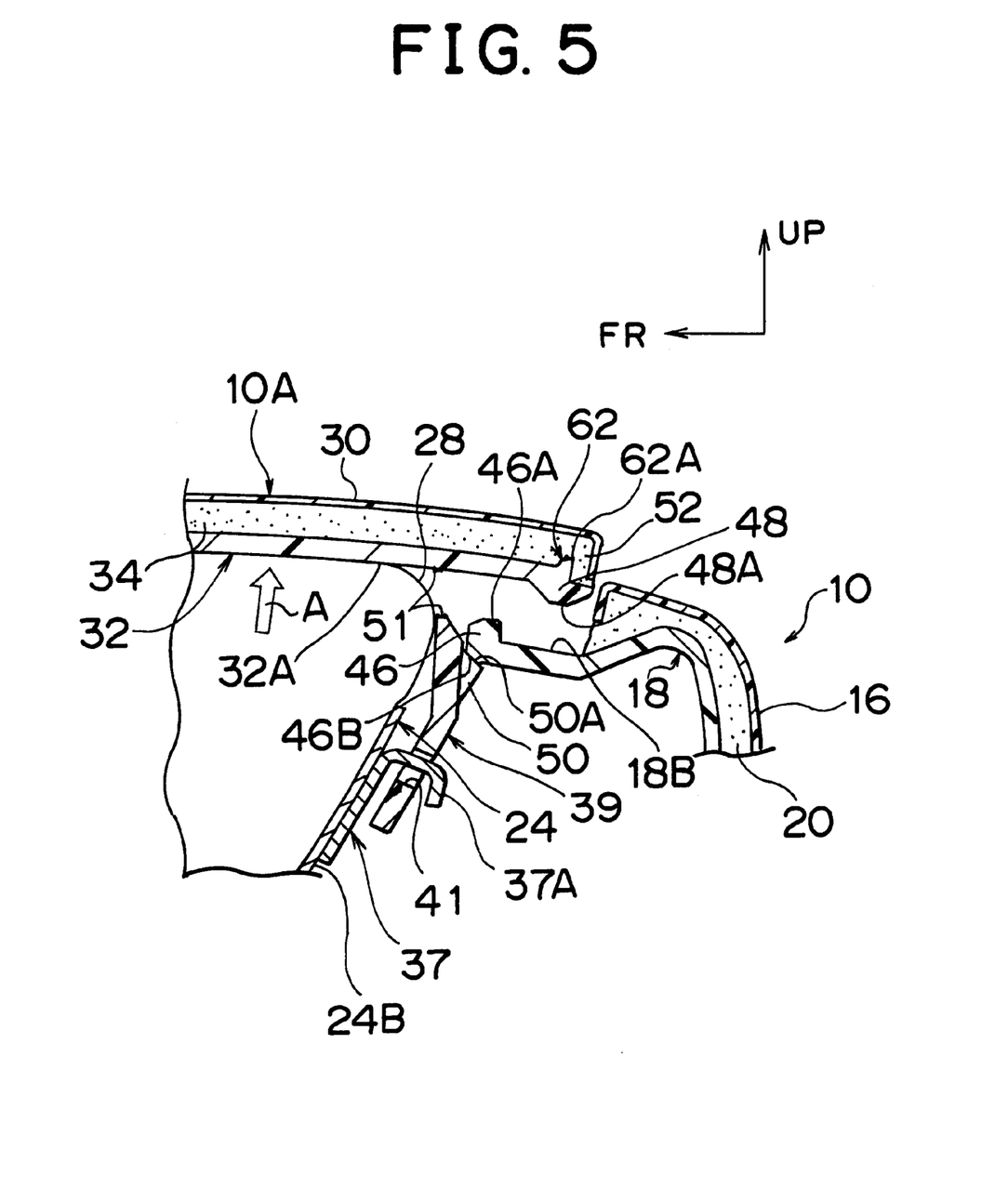
FIG. 5 shows the operation of the instrument panel of FIG. 2 with the integral airbag door portion in accordance with an embodiment of the invention.

In this embodiment, the door insert 32 is pressed toward the passenger compartment, in the direction indicated by arrow A in FIG. 5, by the inflating pressure of the airbag 28 during deployment of the airbag 28. As a result, the mounting flange 39 of the instrument panel insert 18 breaks, excluding the flange portion thereof (the forward side mounting flange portion 39B) extending near and along the deploying or turning axis of the door insert 32. The mounting flange 39 breaks at the thin wall portion 51 thereof, which is formed at a base end position between the general plate portion 32A of the door insert 32 and the protrusions 50. The protrusions 50 are engaged with the peripheral edge portion of the opening 22 of the instrument panel insert 18.

Figure 6:
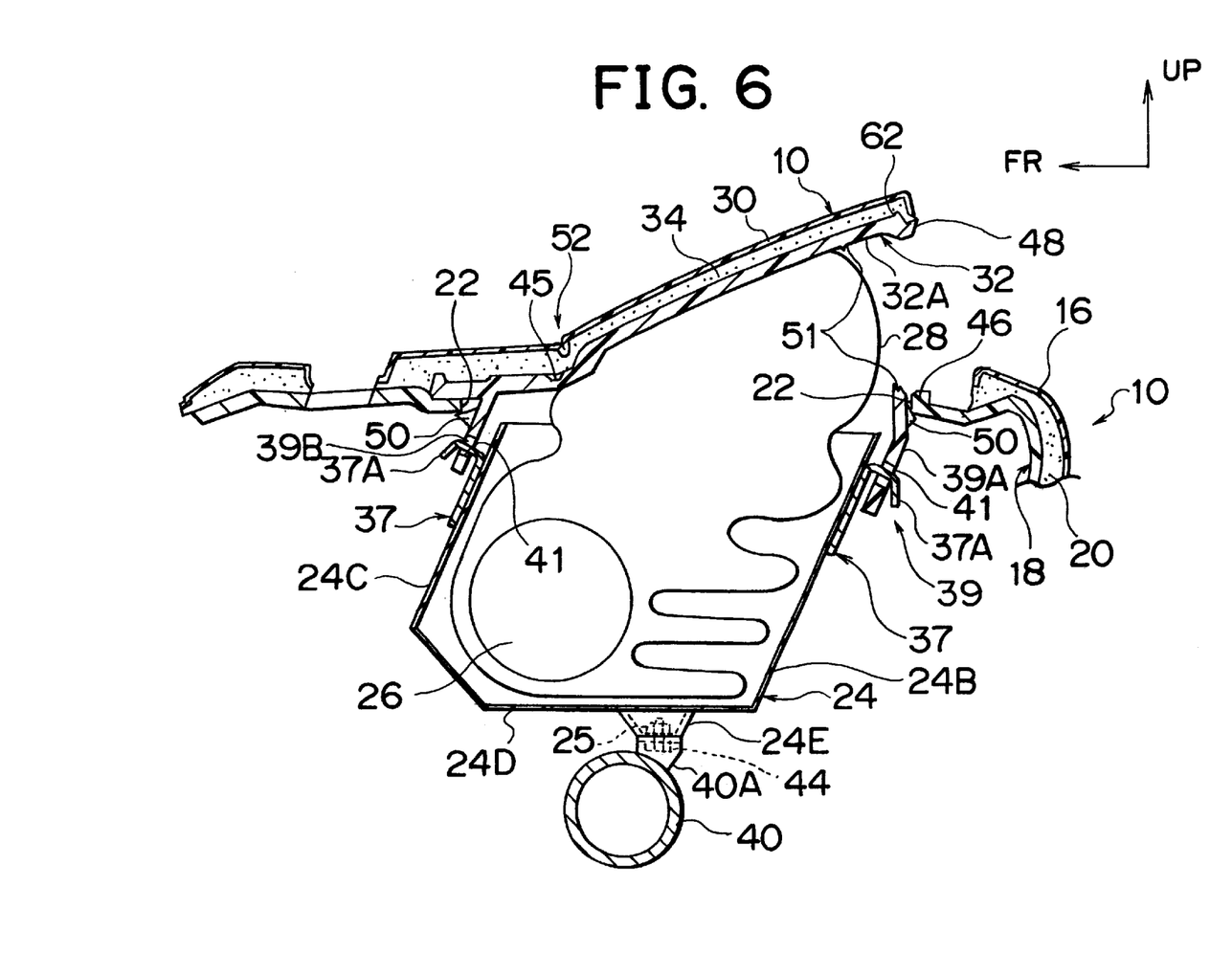
FIG. 6 shows the operation of the instrument panel of FIG. 1 with the integral airbag door portion in accordance with an embodiment of the invention.

Immediately after the thin wall portion 51 of the mounting flange 39 breaks, substantially only the general plate portion 32A of the door insert 32 is deployed toward the passenger compartment. This is accomplished leaving the broken mounting flange 39 of the door insert 32 on the airbag case 24 side, as shown in FIG. 6. This is a result of the engaging holes 41 of the mounting flange 39 of the door insert 32 being engaged with the engaging claws 37A of the panel 37 provided on the airbag case 24.

Furthermore, the protrusions 50 securing the door insert 32 to the peripheral edge portion of the opening 22 of the instrument panel insert 18 are formed together with the mounting flange 39. As a result, the protrusions 50 are left on the airbag case 24 side together with the mounting flange 39 when the thin wall portion 51 of the mounting flange 39 breaks during airbag deployment. Therefore, the protrusions 50 will not push up the peripheral edge portion of the opening 22 of the instrument panel insert 18 with high load during airbag deployment. Hence, there is no need to provide a reinforcement for the peripheral edge portion of the opening 22 of the instrument panel insert 18. That is, no such reinforcement is needed because the opening peripheral edge portion of the instrument panel insert 18 does not receive a high load during airbag deployment.

Further, in this embodiment, the door insert 32 is secured to the instrument panel insert 18 by the protrusions 50 formed on all the sides of the mounting flange 39. The mounting flange 39 has such a generally rectangular frame shape so as to substantially surround the generally rectangular opening of the airbag case 24. This door insert securing construction eliminates the need to prepare separate fastening members, such as bolts, nuts or the like, and eliminates the need to perform a fastening operation in order to secure the door insert 32 to the instrument panel insert 18. Thus, the assembling efficiency is improved. Still further, the protrusions 50 securing the door insert 32 to the instrument panel insert 18 enhance the sealing provided between the door insert 32 and the instrument panel insert 18 by the first seal surface 46A and the second seal surface 48A. Therefore, leakage of the foaming agent during the forming process of the instrument panel 10 can be more reliably prevented.

In this embodiment, the general plate portion 32A of the door insert 32 is opened about the integral hinge 45 formed rearward of the forward side mounting flange portion 39B during airbag deployment. As a result, the door insert 32 does not push down, with high load, the forward peripheral edge portion of the opening 22 of the instrument panel insert 18 secured by the protrusions 50 of the forward side mounting flange portion 39B. Thus, this construction prevents breakage of the forward peripheral edge portion of the opening 22 of the instrument panel insert 18 without requiring an iron or steel plate reinforcement, or the like.

Figure 7:
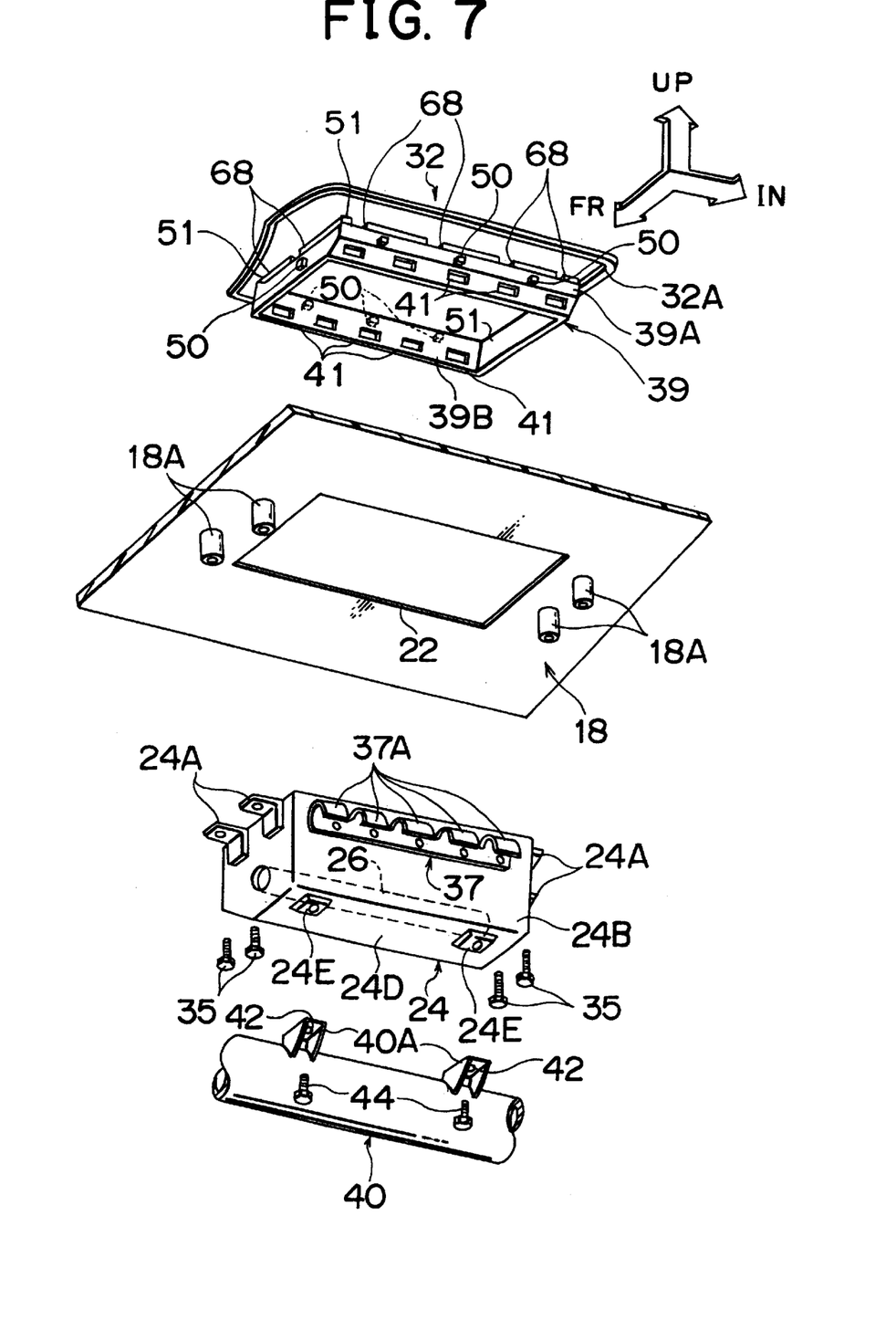
FIG. 7 is an exploded perspective view of an instrument panel with an integral airbag door portion according to another embodiment of the invention, an airbag case, and a portion of an instrument panel reinforcement, viewed from a diagonally rearward perspective view with respect to the vehicle.

Although the invention has been described in detail with reference to the exemplary embodiment, it should be apparent to those skilled in the art that the invention is not limited to the above-described embodiment or construction, but that the invention is intended to cover various modifications and equivalent arrangements within the scope of the invention. For example, the invention may also be constructed as in another embodiment shown in FIG. 7. As shown in FIG. 7, holes 68 are formed together with the thin wall portion 51, as fragile devices that facilitate breakage during airbag deployment. The holes 68 are positioned in the mounting flange 39 between the protrusions 50 of the mounting flange 39 and the general plate portion 32A of the door insert 32, excluding a mounting flange portion extending near and along the deploying axis of the door insert 32. Therefore, the breaking load can be adjusted by the number of holes 68 and the size or length thereof.

Although in the foregoing embodiments, the protrusions 50 have a triangular shape in a side view, the shape of the protrusions 50 is not limited to such a shape, but may also be other shapes. For example, a rectangular shape or the like may be used. In the embodiments, the protrusions 50 do not need to be released from the engagement with the instrument panel insert 18 during airbag deployment. Therefore, the engagement between the protrusions 50 and the instrument panel insert 18 can be enhanced in strength in order to improve the sealing provided by the first seal surface 46A and the second seal surface 48A. Therefore, leakage of the foaming agent during the forming process of the instrument panel 10 can be more reliably prevented.

Still further, the fragile devices, such as the thin wall portion 51, the holes 68 or the like, may be formed at any position or section in the mounting flange 39, excluding a side mounting flange portion extending near and along the deploying axis of the door insert 32. This may be done so long as the position or section is located between the general plate portion 32A of the door insert 32 and the protrusions 50 of the mounting flange 39. For example, the site may be an intermediate site between the protrusions 50 and the base end of the mounting flange 39.

In the foregoing embodiments, the instrument panel with the integral airbag door portion does not need a reinforcement of the opening peripheral edge portion of the instrument panel insert. The need to perform an operation of fastening the door insert to the instrument panel insert is eliminated. As a result, the assembling efficiency is improved. The embodiments also achieve an advantage of reliably preventing breakage of a forward peripheral edge portion of the opening of the instrument panel insert without requiring a reinforcement of the instrument panel insert.

While this invention has been described in conjunction with the exemplary embodiments thereof, it is evident that many alternatives, modifications and variations be apparent to those skilled in the art.

What is claimed is:

1. An instrument panel having an integral airbag door portion and disposed in a vehicle having an airbag case, the instrument panel comprising:
   a skin forming a compartment side surface of the instrument panel;
   a door insert deployable outward from the instrument panel about a forward side portion of the door insert, the forward side portion located forward with respect to the vehicle, the door insert including a plate portion;
   an instrument panel insert having an opening that is engaged with the door insert; and
   a foamed layer expanded between the skin and the door insert and also between the skin and the instrument panel insert,
   wherein the door insert includes:
      a seal portion formed between the door insert and the instrument panel insert, the seal portion preventing leakage of a foaming agent during an expanding formation of the foamed layer;
      a mounting flange portion protruded from a lower surface of the door insert, the mounting flange portion being used for mounting the door insert to the airbag case;
      at least one protrusion formed on the mounting flange portion, the protrusion engaging with an edge portion of the opening of the instrument panel insert; and
      a fragile portion formed in a section of the mounting flange portion, the section of the mounting flange portion being located between the protrusion and the plate portion of the door insert, the fragile portion being breakable during airbag deployment.

2. The instrument panel according to claim 1, wherein the airbag door portion is a single door that is pivotally deployable forward with respect to the vehicle.

3. The instrument panel according to claim 2, wherein the door insert has an integral hinge that is formed in the plate portion of the door insert and that is rearward of a forward side mounting flange portion, and the integral hinge serves as a pivot center during airbag deployment.

4. The instrument panel according to claim 1, wherein the mounting flange portion of the door insert has a frame shape which surrounds a generally rectangular opening of the airbag case, and the at least one protrusion is formed on all sides of the mounting flange portion.

5. The instrument panel according to claim 4, wherein the door insert has an integral hinge that is formed in the plate portion of the door insert and that is rearward of a forward side mounting flange portion located forward with respect to the vehicle, and the integral hinge serves as a pivoting center during airbag deployment.

6. The instrument panel according to claim 1, wherein the skin has a generally "U" shaped groove portion at a position facing an end portion of the door insert, the groove portion being breakable during airbag deployment, and
   wherein the skin is thinner at a bottom portion of the groove portion than at other portions of the groove portion.

7. The instrument panel according to claim 6, wherein the door insert has, at a position adjacent to the groove portion of the skin, a rib that protrudes from the door insert toward the skin so that a spacing between the skin and the door insert is reduced at a site of the rib.

8. The instrument panel according to claim 1, wherein one of the mounting flange portion and the airbag case has an engaging claw, and the other one of the mounting flange portion and the airbag case has an engaging hole that is engaged with the engaging claw.

9. The instrument panel according to claim 1, wherein the fragile portion includes a thin wall portion that is thinner than an adjacent portion of the mounting flange portion.

10. The instrument panel according to claim 1, wherein the fragile portion includes a hole formed in the mounting flange portion.

11. An instrument panel having an integral airbag door portion of a skin-integrated foamed type in a vehicle body, the instrument panel comprising:
    an airbag case fixed to the vehicle body;
    a door insert deployable outward from the instrument panel about a forward side portion of the door insert, the forward side portion of the door insert located forward with respect to the vehicle, the door insert including a plate portion;
    a mounting flange portion protruded from a lower surface of the door insert, the mounting flange portion being used for mounting the door insert to the airbag case;
    at least one protrusion formed on the mounting flange portion, the protrusion engaging with an opening edge portion of the instrument panel insert; and
    a fragile portion formed in a section of the mounting flange portion, the section of the mounting flange portion being located between the protrusion and the plate portion of the door insert, the fragile portion being breakable during airbag deployment.

12. The instrument panel according to claim 11, wherein one of the mounting flange portion and the airbag case has an engaging claw, and the other one of the mounting flange portion and the airbag case has an engaging hole that is engaged with the engaging claw.

13. The instrument panel according to claim 11, wherein the fragile portion includes a thin wall portion that is thinner than an adjacent portion of the mounting flange portion.

14. The instrument panel according to claim 11, wherein the fragile portion includes a hole formed in the mounting flange portion.

* * * * *